United States Patent [19]

Chang et al.

[11] Patent Number: 4,656,246

[45] Date of Patent: Apr. 7, 1987

[54] POLYETHEROXY-SUBSTITUTED POLYPHOSPHAZENE PURIFICATION

[75] Inventors: Suae-Chen Chang; Joseph B. Tedder, Jr.; J. Robert Adams, Jr., all of Baton Rouge, La.

[73] Assignee: Ethyl Corporation, Richmond, Va.

[21] Appl. No.: 840,096

[22] Filed: Mar. 17, 1986

[51] Int. Cl.$^4$ .............................................. C08G 79/04
[52] U.S. Cl. .................................... 528/499; 528/168; 528/399
[58] Field of Search ................ 528/499, 168, 399, 374

[56] References Cited

U.S. PATENT DOCUMENTS

| | | | |
|---|---|---|---|
| 4,258,173 | 3/1981 | Schulz et al. | 528/168 |
| 4,267,311 | 5/1981 | Elefritz | 528/499 |
| 4,477,656 | 10/1984 | Longo et al. | 528/499 |

OTHER PUBLICATIONS

Blonsky et al., J. Am. Chem. Soc. (1984), 106, pp. 6854–6855.
Chemical and Engineering News, Nov. 5, 1984, pp. 23–24.

Primary Examiner—Harold D. Anderson
Attorney, Agent, or Firm—Donald L. Johnson; John F. Sieberth; J. D. Odenweller

[57] ABSTRACT

Polyetheroxy-substituted polyphosphazenes useful in making solid electrolytes are purified by dissolving the impure polyphosphazene in water at a low temperature (e.g. below 40° C.) and heating the water solution to a temperature high enough to cause the purified polyphosphazene to precipitate (e.g. above 50° C.).

16 Claims, No Drawings

POLYETHEROXY-SUBSTITUTED POLYPHOSPHAZENE PURIFICATION

BACKGROUND OF THE INVENTION

Polyetheroxy-substituted polyphosphazenes are known polymers. Their preparation is reported in Schulz et al. U.S. Pat. No. 4,258,173. They can be made by reacting a mono or polyetheroxy alkanol with a polyphosphonitrilic chloride in the presence of triethylamine to take up the evolved HCl. Alternatively, they can be made by reacting a sodium mono or polyetheroxy alkoxide with polyphosphonitrilic chloride in tetrahydrofuran. The polymers are utilized to form films, moldings, coatings, foams, and the like.

More recently a new utility for these polyetheroxy-substituted polyphosphazene has been reported by P. M. Blonsky, D. F. Shriver, P. Austin and H. R. Allcock, J. Am. Chem. Soc., 106, 6854 (1984). These authors describe solid electrolytes for use in electrical apparatus such as batteries which are made using polyetheroxy-substituted polyphosphazenes which are complexed with lithium, silver, sodium, rubidium, calcium, strontium, zinc, gadolinium or neodynium salts. In this electrolyte use it has been found that it is important that impurities be reduced to a very low level. When made by conventional methods, such as the reaction of sodium mono or polyetheroxy alkoxide with polyphosphonitrilic chloride, the resultant polymer contains high levels of mono or polyetheroxy alkanol, sodium and chloride impurities which are detrimental to the use of the polymer in electrolyte applications.

SUMMARY OF THE INVENTION

It has now been discovered that polyetheroxy-substituted polyphosphazenes that are soluble in water at moderate temperatures can be caused to precipitate by heating their water solution to a higher temperature. When the polyetheroxy-substituted polyphosphazene precipitates, any water-soluble impurities such as alcohols, alkoxy alcohols, polyalkoxy alcohols, salts and the like which were in the original polyphosphazene remain in water solution resulting in a highly purified polyetheroxy-substituted polyphosphazene precipitate suitable for use in making a solid electrolyte.

DESCRIPTION OF THE PREFERRED EMBODIMENTS

A preferred embodiment of the invention is a process for purifying an impure polyetheroxy-substituted polyphosphazene, said process comprising (a) dissolving said impure polyphosphazene in water at a temperature at which said polyphosphazene is water-soluble, (b) heating the resulting water solution to a higher temperature at which at least part of said polyetheroxy-substituted polyphosphazene precipitates, and (c) recovering the purified polyetheroxy-substituted polyphosphazene precipitate.

Methods for making polyetheroxy-substituted polyphosphazenes are described in Schulz et al. U.S. Pat. No. 4,258,173. The preparation involves first preparing a pure cyclic phosphonitrilic chloride trimer by reacting phosphorus pentachloride with ammonium chloride in a solvent such as monochlorobenzene at 124°–130° C. The trimer is then separated and recovered by means such as distillation, sublimation, crystallization and the like. The purified trimer is then polymerized by heating in a sealed vessel at about 225°–250° C. for 12–48 hours. A trace amount of a Lewis Acid (e.g. AlCl$_3$, BCl$_3$, etc.) can be included to catalyze the polymerization. The polymerization must be stopped prior to the onset of cross-linking which would result in a gel that is insoluble in solvents such as tetrahydrofuran (THF), benzene, cyclohexane and thus cannot be used to prepare substituted polyphosphazenes. The uncross-linked polyphosphonitrilic chloride is mainly a linear polymer containing about 50–50,000 or more (PNCl$_2$) units and is soluble in solvents such as THF, benzene and cyclohexane.

The polyphosphonitrilic halide is reacted with an alkali metal mono or polyetheroxy alkoxide having the formula

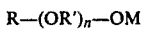

$$R\!-\!(OR')_n\!-\!OM$$

wherein M is an alkali metal, R is alkyl, aryl, cycloalkyl, alkaryl, or aralkyl, R' is a divalent aliphatic hydrocarbon group and n is an integer from 1 to 70. When R is alkyl it can contain from 1 to 20 or more carbon atoms. Some examples are methyl, ethyl, n-propyl, isopropyl, n-butyl, isobutyl, sec-butyl, n-pentyl, 2-methylbutyl, n-dodecyl, 2-ethyldecyl, n-hexadecyl, 2-ethyltetradecyl, 2-ethyloctadecyl, n-eicosyl and the like.

When R is aryl it can contain 6 to 20 or more carbon atoms and can be substituted or unsubstituted such as phenyl, α-naphthyl, 4-phenylphenyl, 4-methoxyphenyl, 4-ethoxyphenyl, 4-butoxyphenyl, 4-(2-ethoxyethoxy)phenyl, 4-nitrophenyl, 2-acetylphenyl, 2-acetyloxyphenyl, 4-phenoxyphenyl and the like.

When R is cycloalkyl it can contain from 5 to 12 or more carbon atoms. Some examples of these are cyclopentyl, cyclohexyl, cyclooctyl, cyclododecyl and the like.

When R is alkaryl it can contain from 7 to 20 or more carbon atoms. Some examples of these are o-tolyl, o-ethylphenyl, 4-sec-butylphenyl, 4-n-decylphenyl, 2,4-dimethylphenyl, 2,4-di(2-ethylhexyl)phenyl, 2,4,6-trimethylphenyl, 4-tetradecylphenyl and the like.

When R is aralkyl it can contain from 7 to 20 or more carbon atoms. Some examples of these are benzyl, α-methylbenzyl, α,α-dimethylbenzyl, phenethyl, 4-phenylbutyl, 6-(2-methylphenyl)-hexyl and the like.

R' can be any divalent aliphatic hydrocarbon group. These include alkylene groups containing from 2 to 20 or more carbon atoms and especially the lower alkylene groups containing about 2–4 carbon atoms such as ethylene —CH$_2$CH$_2$—, 1,2-propylene —CH(CH$_3$)CH$_2$—, 1,2-butylene —CH$_2$CH(C$_2$H$_5$)—and the like.

Some examples of the alkoxides are sodium 2-methoxyethoxide, sodium 2-ethoxyethoxide, potassium 2-ethoxybutoxide, potassium 2-(ethoxyethoxy)ethoxide, sodium 2-phenoxyethoxide, sodium 2-(2-phenoxyethoxy)ethoxide, sodium polyethoxyethoxide (n =12), potassium 2-(cyclohexoxyethoxy)ethoxide, potassium 2-[2-(4-methoxyphenoxy)ethoxy]ethoxide, sodium 2-[2-(2-chlorophenoxy)propoxy]propoxide and the like.

In a more preferred embodiment R is an alkyl and R' is a lower alkylene. In a still more preferred embodiment R is a lower alkyl containing 1 to about 4 carbon atoms, R' is a lower alkylene containing 2–4 carbon atoms, M is sodium and n is an integer from 1 to 10 and still more preferably from 2 to 6. In a most preferred embodiment R is methyl or ethyl, R' is ethylene —CH$_2$CH$_2$—, M is sodium and n is 2–4.

It is not necessary that all of the phosphorus substituents are the polyetheroxy groups. Preferably at least 50 mole percent and more preferably at least 80 mole percent of the phosphorus substituents are the above R—(OR')$_n$—O—groups. The remaining groups can be substituted or unsubstituted $C_{1-12}$ alkoxy, $C_{6-12}$ aryloxy, $C_{5-12}$ cycloalkoxy, $C_{7-12}$ alkaryloxy or $C_{7-12}$ aralkoxy wherein the substituents can be halogen, hydroxyl, amine, alkylamine, dialkylamine, alkoxy, aryloxy and the like. More preferably at least 90 mole percent of the phosphorus substituents are polyetheroxy groups and most preferably substantially all of the phosphorus substituents are polyetheroxy groups.

The polyphosphonitrilic halide and alkali metal mono or polyetheroxy alkoxide are reacted in an inert solvent in which both reactants and the polyetheroxy-substituted polyphosphazene product are soluble. Preferred solvents of this class are the mono and polyethers such as tetrahydrofuran (THF), dioxane, dimethoxyethane, diethoxyethane, di-methoxyethyl ether (diglyme) and the like. The preferred solvent is THF.

The amount of solvent should be enough to dissolve the reactants and products. A useful range is about 1–50 parts by weight solvent per each part reactant. A more preferred range is about 5–10 parts solvent per part reactant.

The amount of alkali metal mono or polyetheroxy alkoxide should be sufficient to react with all or most of the halogen bonded to phosphorus. A useful range is about 0.9–1.2 equivalents of mono or polyetheroxy alkoxide per equivalent of halide. A more preferred range is about 1.0–1.1 equivalent of mono or polyetheroxy alkoxide per equivalent of halogen.

The polyphosphonitrilic halide is usually added to an ether or polyether solvent of the alkali metal mono or polyetheroxy alkoxide. The polyphosphonitrilic halide is frequently diluted with a solvent such as THF or cyclohexane to make handling easier and aid in the reaction. When it is diluted with a solvent such as cyclohexane and added to an ether or polyether solution of the alkali metal mono or polyetheroxy alkoxide, a mixed solvent results. The amount of ether or polyether should be sufficient to maintain the polyetheroxy-substituted polyphosphazene in solution.

The substitution reaction proceeds by replacing the halogen with the mono or polyetheroxy alkoxide groups forming alkali metal halide byproduct. This reaction is usually complete in a few minutes but can be held at about 50°–150° C. for up to 8 hours or more. In THF it is preferably conducted at reflux temperature. The reaction mixture is then preferably neutralized by adding an acid such as sulfuric acid. This converts any unreacted alkali metal mono or polyetheroxy alkoxide to an alkali metal salt (e.g. $Na_2SO_4$) and mono or polyetheroxy alkanol.

Following the substitution reaction and neutralization, the salt is in very finely divided form. In order to grow larger salt particles a small amount of a saturated aqueous salt solution is preferably added and stirred into the mixture. An amount equal to about 1–10 weight percent of the reaction mixture is usually sufficient. The preferred salt used to form the saturated solution is sodium bromide.

The reaction mixture is next filtered or centrifuged to remove the salt precipitate. The solids-free reaction solution is then mixed with a cycloalkane to coagulate and precipitate the polyetheroxy-substituted polyphosphazene. This may be done by adding cycloalkane to the ether solution or by adding the ether solution to the cycloalkane.

The polyphosphazene gum at this stage still contains small amounts of alkoxy alcohol, polyalkoxy alcohol and salt. In order to use the polyetheroxy-substituted polyphosphazene in the preparation of a solid electrolyte, it is highly preferred that the initial polymer be substantially free of all salt. This makes the later controlled complexing of the polymer with a specified amount of other salts (e.g. lithium salts) more accurate and able to produce the desired conductivity.

It has now been surprisingly found that the polyetheroxy-substituted polyphosphazenes are more soluble in water at ambient temperature than they are at elevated temperatures. This permits removal of essentially all of the salt by dissolving the polymer in water at lower temperatures (e.g. ambient temperature up to about 40° C.) and then heating the solution to a higher temperature which is high enough to reduce solubility and cause at least part of the polymer to precipitate leaving water-soluble impurities (e.g. alcohol, alkoxy alcohol, polyalkoxy alcohol and salt) in solution.

The initial water solution is usually made at temperatures from about 10° to 40° C. A preferred temperature is at ambient or in the range of 20°–30° C. At these temperatures, the solubility of a typical polyetheroxy-substituted polyphosphazene (viz. poly-2-(2-methoxyethoxy)ethoxyphosphazene, "MEEP") has been found to be in the range of about 450–600 grams per liter of water. Whatever the solubility of the particular polymer might be is not critical because it will decrease on heating. The preferred manner in which to conduct the purification is to stir a mixture of water and impure polyetheroxy-substituted polyphosphazene at a moderate temperature in the range of about 10°–40° C., more preferably 20°–30° C., until the solution is about 10% polymer. Any undissolved impure polymer is then removed and the water solution heated to a temperature high enough to cause at least part of the dissolved polymer to come out of solution and precipitate. The precipitation temperature is preferably above about 40° C. up to reflux. More preferably the precipitation temperature is above about 50° C. and still more preferably above about 60° C. The most preferred precipitation temperature for MEEP now known is in the range of 70°–80° C.

The mixture is then held at precipitation temperature for a period long enough to achieve substantial precipitate. This usually takes only a few minutes. The precipitated polymer is then separated from the aqueous phase. An easy way to do this is by merely draining the water layer from the polymer which floats in the swollen state.

The purified polymer is sometimes of sufficient purity at this stage to be merely dried and used to prepare metal complexes for use as solid electrolytes. If an undesirable amount of residual water-soluble impurities remain, the polymer can be put through the purification cycle again to further reduce impurities.

The wet purified polymer can be dried by any method. For example it can be merely heated in a vacuum oven to evaporate water. A preferred method is to dissolve the polymer in an ether such as THF and then co-distill the water and THF azeotrope and finally evaporate the THF under vacuum. Alternatively, the wet polymer can be dissolved in THF and coagulated by adding cyclohexane. Following this the coagulated gum is separated and dried under vacuum.

The following example will serve to show how the process is conducted.

EXAMPLE 1

A THF solution of a high molecular weight substantially linear polyphosphonitrilic chloride was added to a THF solution of sodium 2-(2-methoxyethoxy)ethanol (10 mole percent excess). This mixture was stirred and refluxed for 6 hours. The solution was then cooled and neutralized with concentrated $H_2SO_4$ to a pH of 7. Cyclohexane was added until the poly-2-(2-methoxyethoxy)ethoxy phosphazene (MEEP) gum precipitated (100 grams). The liquid phase was decanted and the polymer dissolved in 900 mLs of water at room temperature. The aqueous solution was heated gradually to 65° C. while stirring and 93 grams of MEEP precipitated. The MEEP was dried by dissolving in THF and heating to distill out a THF-water azeotrope and finally the remaining THF was evaporated from the polymer gum under vacuum.

EXAMPLE 2

A 500 gram portion of 10 weight percent MEEP in THF was first purified by centrifugation and their coagulating twice by adding cyclohexane to the THF solution. After the solvent was evaporated from the coagulated MEEP it was dissolved in 450 grams of water at room temperature. A 250 gram portion of the aqueous solution was placed through an ion exchange resin (Amberlite ® IRM-150). At this point the MEEP polymer analyzed 49 ppm total chlorine by wet chemical method.

The remaining aqueous MEEP solution was heated to 65° C. causing the MEEP to precipitate. This water precipitation was repeated and the dried MEEP was analyzed by the same wet chemical method and found to contain 32 ppm total chlorine. This is substantially lower than that achieved through ion exchange.

EXAMPLE 3

A solution of ethoxyethoxyethoxyethoxy-substituted high molecular weight linear polyphosphazene "4EP" was prepared by reacting a THF solution of sodium ethoxyethoxyethoxyethoxide with a cyclohexane solution of linear polyphosphonitrilic chloride. This was neutralized with $H_2SO_4$ and then mixed with 33 grams saturated aqueous NaBr acid centrifuged and decanted to give a clear brown solution. The 4EP was precipitated by adding more cyclohexane. The precipitate was re-dissolved in THF and again precipitated with cyclohexane. The 4EP was dried under vacuum and the polymer (80 gram) was dissolved in 720 grams of diionized water at room temperature. A 400 gram portion of this aqueous solution was passed through an ion exchange resin (Amberlite ® IRM-150) which gave a resultant dried 4EP analyzing 83 ppm total chlorine by wet chemical analysis.

The remaining 400 gram portion of aqueous 4EP solution was heated to 65° C. causing it to precipitate. This 4EP after drying contained only 19 ppm total chlorine.

An experiment was conducted to determine the solubility of MEEP in water as a function of temperature. An initial aqueous MEEP solution was gradually heated while stirring and a sample of the aqueous phase was periodically removed. The following results were obtained:

TABLE I

| Temperature (° C.) | Weight Percent MEEP in Solution |
|---|---|
| 30 (initial) | 18.8 |
| 62 | 18.8 |
| 63.5 | 15.27 |
| 65 | 3.69 |
| 67 | 0.95 |
| 71 | 0.53 |
| 75 | 0.16 |

The above experiment was repeated starting with a higher concentration of MEEP with the following results.

TABLE I

| Temperature (° C.) | Weight Percent MEEP in Solution |
|---|---|
| 30 (initial) | 28.42 |
| 59 | 28.42 |
| 61 | 27.56 |
| 63 | 6.92 |
| 65 | 2.15 |

As these results show, there is a sharp drop in solubility of MEEP in water on heating above about 60° C.

We claim:

1. A process for purifying an impure polyetheroxy-substituted polyphosphazene, said process comprising
   (a) dissolving said impure polyphosphazene in water at a temperature at which said polyphosphazene is water-soluble,
   (b) heating the resulting water solution to a higher temperature at which at least part of said polyetheroxy-substituted polyphosphazene precipitates, and
   (c) recovering the purified polyetheroxy-substituted polyphosphazene precipitate.

2. A process of claim 1 wherein at least 50 mole percent of the polyphosphazene phosphorus substituents are polyetheroxy groups having the formula $$R-(OR')_n-O-$$

wherein R is selected from substituted or unsubstituted alkyl, cycloalkyl, aryl, alkaryl or aralkyl, R' is a divalent aliphatic hydrocarbon group and n is an integer from 1 to 70, the remaining polyphosphazene phosphorus substituents if any being selected from substituted or unsubstituted alkoxy, cycloalkoxy, aryloxy, alkaryloxy, aralkoxy, alkenyloxy or alkenylaryloxy.

3. A process of claim 2 wherein at least 80 mole percent of the polyphosphazene phosphorus substituents are said polyetheroxy groups.

4. A process of claim 3 wherein n is an integer in the range of 2–6.

5. A process of claim 4 wherein R is a lower alkyl containing 1 to about 4 carbon atoms.

6. A process of claim 5 wherein R' is a divalent aliphatic hydrocarbon radical containing 2 to about 4 carbon atoms.

7. A process of claim 6 wherein R' is $-CH_2CH_2-$.

8. A process of claim 7 wherein R is methyl or ethyl.

9. A process of claim 8 wherein said polyphosphazene is dissolved in water at a temperature below about 40° C. and is precipitated from the water solution by heating to a temperature above 50° C. and high enough to cause said precipitation.

10. A process of claim 9 wherein R is methyl.

11. A process of claim 10 wherein n is in the range of about 2–4.

12. A process of claim 11 wherein said polyphosphazene is dissolved in water at a temperature below about 40° C. and is precipitated from the water by heating to a temperature above 60° C. and high enough to cause said precipitation.

13. A process for purifying a polyethyleneoxy-substituted phosphazene which contains water-soluble impurities, said process comprising dissolving said polyphosphazene in water at a temperature below about 40° C. and then heating said solution above about 50° C. and high enough to precipitate the purified polyethyleneoxy-substituted phosphazene whereby said water-soluble impurities remain in solution.

14. A process of claim 13 wherein said polyethyleneoxy substituents have the formula $$R-(O-CH_2CH_2)_n-O-$$

wherein n is an integer from 1 to 70.

15. A process of claim 14 wherein n is an integer from 2 to 6.

16. A process of claim 15 wherein n is an integer from 2 to 4.

* * * * *